US011959738B2

(12) United States Patent
Monks et al.

(10) Patent No.: US 11,959,738 B2
(45) Date of Patent: Apr. 16, 2024

(54) OPTICAL TRIANGULATION MEASUREMENT APPARATUS AND METHOD

(71) Applicant: Third Dimension Software Limited, Bristol (GB)

(72) Inventors: Timothy Peter Monks, Bristol (GB); Jeremy William Riley, Bristol (GB); Michael Thomas Briggs, Bristol (GB)

(73) Assignee: Third Dimension Software Limited, Bristol (GB)

( * ) Notice: Subject to any disclaimer, the term of this patent is extended or adjusted under 35 U.S.C. 154(b) by 105 days.

(21) Appl. No.: 17/475,713

(22) Filed: Sep. 15, 2021

(65) Prior Publication Data

US 2022/0082372 A1 Mar. 17, 2022

(30) Foreign Application Priority Data

Sep. 16, 2020 (GB) ..................................... 2014596

(51) Int. Cl.
*G01B 11/24* (2006.01)
*G06T 7/194* (2017.01)
(Continued)

(52) U.S. Cl.
CPC .............. *G01B 11/24* (2013.01); *G06T 7/194* (2017.01); *G06T 7/60* (2013.01); *H04N 23/56* (2023.01)

(58) Field of Classification Search
CPC ......... E01F 9/608; F21S 9/03; F21V 23/0442; G01B 11/24; G01B 11/14; G01B 11/2518;
(Continued)

(56) References Cited

U.S. PATENT DOCUMENTS 5,090,233 A * 2/1992 Kogure ................. G01N 21/85
73/865.5
5,383,026 A 1/1995 Mouri et al.
(Continued)

FOREIGN PATENT DOCUMENTS

EP 0071426 A2 9/1983
EP 2908093 A1 8/2015
(Continued)

OTHER PUBLICATIONS

Extended European Search Report dated Jan. 21, 2022 in Application No. 21196412.7; 8 pages.
(Continued)

*Primary Examiner* — Tri T Ton
(74) *Attorney, Agent, or Firm* — Troutman Pepper Hamilton Sanders LLP

(57) ABSTRACT

An apparatus and method for inspecting an object by optical triangulation, where the signal of interest in a captured image corresponds to an interaction between a light beam and an environment surrounding the object rather than between a light beam and the object itself. The surrounding environment may be configured to interact in a manner that is detectable by filling it with a flowable scattering medium, e.g. a gas, mist or vapour comprising a suspension of fine particles in air. Light that is scattered by the flowable scattering medium is visible in a captured image. Where the flowable scattering medium is not present, e.g. because the object blocks it, the scattered signal is less. A boundary of a scattered signal region may thus provide information about the location of an object.

16 Claims, 4 Drawing Sheets

(51) Int. Cl.
    *G06T 7/60*           (2017.01)
    *H04N 23/56*        (2023.01)

(58) Field of Classification Search
    CPC ........ G01B 13/12; G01B 13/16; G06T 7/194;
                   G06T 7/60; G09F 19/22; H04N 5/77;
                           H04N 7/18; H04N 23/56
    USPC .................................................. 356/600–640
    See application file for complete search history.

(56) References Cited

U.S. PATENT DOCUMENTS

| | | | |
|---|---|---|---|
| 6,737,666 B1 * | 5/2004 | Ito | H01J 37/32963 |
| | | | 438/16 |
| 8,427,656 B2 * | 4/2013 | Hullin | G06T 7/521 |
| | | | 356/601 |
| 2015/0146200 A1 * | 5/2015 | Honda | G01N 21/8806 |
| | | | 356/237.5 |
| 2016/0125591 A1 | 5/2016 | Kudo et al. | |
| 2019/0145762 A1 | 5/2019 | Chiu et al. | |
| 2020/0158502 A1 * | 5/2020 | Tsai | G01B 9/02024 |

FOREIGN PATENT DOCUMENTS

| | | |
|---|---|---|
| RU | 2503032 C2 * | 12/2013 |
| WO | 2019215255 A1 | 11/2019 |
| WO | 2020/082099 A1 | 4/2020 |

OTHER PUBLICATIONS

Patents Act 1977: Search Report under Section 17 issued in UK Patent Application No. GB2014596.7 dated Mar. 15, 2021.

* cited by examiner

OPTICAL TRIANGULATION MEASUREMENT APPARATUS AND METHOD

CROSS REFERENCE TO RELATED APPLICATION

This patent application claims the benefit of UK patent application no. 2014596.7 filed on 16 Sep. 2020, which is incorporated by reference herein.

FIELD OF THE INVENTION

The invention relates to measurement apparatus and methods which uses triangulation principles to measure the physical geometry of articles and/or their relative position to each other. For example, the invention may be used with a laser triangulation sensor.

In particular, the present invention concerns utilising an interaction between a measurement signal and an environment surrounding an object in order to identify a boundary between the object and the environment.

BACKGROUND TO THE INVENTION

Optical measurement systems which use a laser triangulation sensor to obtain dimensional information about objects are known. For example, such systems may be arranged to determine the distance of objects from the sensor or the profile of objects within the field of view of the sensor.

Referring to FIG. 1, a conventional laser triangulation measurement device 1 comprises a light source 2 e.g. laser which is arranged to project a planar beam 4 (e.g. sheet) of light. The planar beam 4 is incident as a line 8 on an object or objects 5, 6 which lie in the field of view 7 of the device 1. Light reflected from the incident line 8 is collected by an imaging device 3, which may be a camera (e.g. having a charge coupled device (CCD) or an active pixel sensor (CMOS) device).

The images captured by the imaging device 3 are processed to determine a data representation of the physical geometry of the objects 5, 6. The processing may involve reference to a calibrated look up table or the like. Such processing is known.

FIG. 2 depicts two dimensions that may be determined using the data representation. The separation (gap G) or planar misalignment (mismatch or flush F) between adjacent surfaces may be determined, e.g. by performing suitable mathematical operations (e.g. line/radius fitting).

An example of a conventional optical triangulation sensor is the GapGun, manufactured by Third Dimension Software Limited.

One challenge for optical triangulation measurements of the type discussed above is how to obtain accurate measurements if the object being measured is transparent or reflective. It is difficult to obtain a clear signal from the interaction between the planar beam and such objects. For transparent objects, the signal may be minimal and therefore difficult to distinguish from background noise. For reflective objects, the signal may be disturbed by specular effects, which inhibits accurate determination of the location of a surface.

Such difficulties can be exacerbated if the transparent or reflective regions are adjacent to regions (e.g. coloured or matt surfaces) that are readily imaged. A single imaging modality is unlikely to cope with range of contrast between signals from the different regions.

A known way to address the problem of measuring reflective surfaces is to use diffuse reflections. For example, U.S. Pat. No. 7,046,378 discloses an optical triangulation sensor that includes a diffuse reflector on the optical sensor itself, so that a "direct" reflection is bounced back as a diffuse beam that is then reflected again from the surface and detected.

In respect of transparent objects, it is also known to apply a coating of condensation to a surface of the object, and then to detect a diffuse reflection to calculate the surface shape using triangulation. For example, WO 2020/082099 A1 discloses a device for inspecting a reflective or transparent surface that includes condensing a liquid on a surface of an object to be measured.

SUMMARY OF THE INVENTION

At its most general, the present invention provides a technique for inspecting an object by optical triangulation, where the signal of interest in a captured image corresponds to an interaction between a light beam and an environment surrounding the object rather than between a light beam and the object itself. The surrounding environment may be configured to interact in a manner that is detectable by filling it with a flowable scattering medium, e.g. a gas, mist or vapour comprising a suspension of fine particles in air. Light that is scattered by the flowable scattering medium is visible in a captured image. Where the flowable scattering medium is not present, e.g. because the object blocks it, the scattered signal is less. A boundary of a scattered signal region may thus provide information about the location of an object.

According to one aspect of the invention, there is provided an optical triangulation apparatus comprising: a light source configured to emit a light beam through a detection zone; an image sensor configured to capture an image of the detection zone; a generator configured to introduce a flowable scattering medium, e.g. a gas, mist or vapour, into the detection zone; and a processor configured to: receive a measurement image of the detection zone captured by the image sensor; and determine a boundary of a scattered signal region in the received measurement image. In use, an object is positioned in the detection zone in a position where a surface thereof intersects the light beam. Since the flowable scattering medium cannot exist in the volume occupied by the object, the boundary of the scattered signal region may coincide with a boundary of the object. The processor may be configured to determine the boundary by identifying a transition between the scattered signal region and a scatter-free region. The scatter-free region may correspond to the object in the detection zone.

The flowable scattering medium may be an airborne material, i.e. a scattering substance that is conveying by a carrier gas, which may be air. The airborne material may comprise any suitable airborne particulate substance capable of scattering the light beam. While the discussion below refers to the use of vapour, it is to be understood that the flowable scattering medium may comprise any suitable substance, e.g. gas, solid (e.g. powder) or liquid.

In one example, the flowable scattering medium may be a vapour, e.g. a mist of solid particles or liquid droplets. In one example, the vapour is a distilled water mist. The scattered signal region may thus be a region in the received image corresponding to light in the light beam that is scattered by the vapour. For example, the vapour may resemble an illuminated curtain within the field of view of the image sensor. The boundary of the scattered signal region may correspond to transition between the illuminated curtain and a region with a lower return signal. The boundary may be determined by analysed the measurement image to determine the location of this transition, e.g. by detecting a change in signal intensity between adjacent pixels in the image. the boundary may be identified as existing at location where the change in signal intensity between adjacent pixels exceeds a predetermined threshold.

In another example, the flowable scattering medium may be or may comprise a substance (e.g. a gas) that fluoresces in the presence the light source or some other source of excitation radiation. The excitation radiation may have a different wavelength from the fluorescence. The image sensor may be configured to filter the excitation radiation, so that it detects the fluorescence radiation emitted by the scattering medium rather than any reflected excitation radiation. The excitation radiation and the fluorescence may be visual light, UV, IR or elsewhere in the EM spectrum.

The processor may be further configured to: receive a background image of the detection zone that is captured by the image sensor in the absence of the vapour; and remove from the received measurement image a background signal obtained from the background image. This process may improve a signal to noise ratio, and therefore enable the boundary to be determined with greater accuracy. The background image may include a signal caused by ambient light in the detection zone. In some examples, the background image may be captured with the object in the detection zone and illuminated by the light beam. In this case, the background image may include a signal caused by an interaction between the object and the light beam. Removing or reducing this signal may ensure that any reflections or speckle from the object does not obscure the signal from the vapour.

The light source and image sensor may be mounted in a portable unit for movement relative to an object in order to locate the object in the detection zone. For example, the light source and image sensor may be part of an optical triangulation sensor that can be manipulated either manually or in an automated manner (e.g. on a robotic arm in a manufacturing production line or the like), to adopt a suitable position with respect to the object. The vapour generator may also be part of the portable unit.

Alternatively, the apparatus may comprise an enclosure that houses the light source and image sensor. The enclosure may include an object support structure for receiving an object in the detection zone. The detection zone may be within the enclosure, i.e. an internal volume thereof. The enclosure may have an entry port for receiving the object. In some examples, the enclosure may have both an entry port and an exit port, whereby the enclosure surrounds an object inspection path, e.g. conveyor or the like, along which objects for inspection are moved. Such an arrangement may allow for inspection of continuous objects (e.g. tubes or woven material) or objects in situ on a production line.

The enclosure provides a self-contained environment for the vapour. It may be suitable for inspecting smaller objects, e.g. precision engineered components, in particular small transparent optical components, such as lenses, electronic components and consumer electronics device.

The processor may be further configured to calculate a geometrical property of the object from the boundary of the scattered signal region. For example, using conventional triangulation principles, the location of the boundary in the detection zone may be calculated. The processor may be configured to generate an output for display or transmission to another device (e.g. a central server). The output may be the calculated geometrical property, or information representative of the boundary, or even the measurement image itself. The processor may be located with the image sensor or may be located remotely therefrom. The geometrical property may be used to identify or measure surface features on the object, e.g. the gap or planar misalignment discussed above. Alternatively or additionally, the detection zone may be scanned by the light beam to record a shape of an object's surface from a plurality of measured boundaries of the scattered signal region.

The light source may be configured to emit polarised light. The light may be naturally polarised, e.g. from a laser. Alternatively, the light source may comprise a polariser arranged to apply a polarisation state to light in the light beam. The image sensor may include a polarisation filter configured to reject light that is multiply scattered by the vapour. Multiply scattered light has reduced polarisation compared with light that is directly (singly) scattered from the vapour. Consequently, the polarisation filter may be configured to favour a polarisation corresponding to the directly scattered signal and reject light with other polarisations. This arrangement may further improve the signal to noise ratio by removing from the measurement image a glow associated with multiply scattered light.

The vapour generator may comprise any suitable means for generating a suspension of airborne particles. In one example, the vapour generator comprises an atomizer, such as an ultrasonic mist maker, configured to generate a fine mist of particles. Alternatively, the vapour generator may comprise a spray configured to generate a fine mist of powder or liquid droplets, e.g. by pushing a substance under pressure through a nozzle. In yet another example, the vapour generator may comprise a heater configured to generate the vapour by evaporating a liquid.

The vapour generator may be disposed adjacent to the detection zone in a manner that facilitates diffusion of the vapour therethrough. For example, the vapour generator may be disposed above the detection zone, so that vapour comprises a substance that is more dense than air will naturally fall through the detection zone under gravity. In other examples, the vapour generator may comprise a forced airflow unit configured to drive the vapour into the detection zone. Preferably the vapour is driven in a direction away from the image sensor, in order to minimise the amount of vapour between the plane of the laser beam and the image sensor. For example, the vapour generator may comprise a fan or suction device. This arrangement may facilitate a rapid and uniform distribution of the vapour within the detection zone.

The light source and image sensor may be similar to those used in conventional optical triangulation sensors. For example, the light source may be a laser. The laser may have a wavelength selected to correspond to a peak in a scattering spectrum for the vapour. In one example, the wavelength of the laser is 724 nm.

The light beam may be a planar light beam. The light source may thus comprise an optical component configured to emit a planar light beam through the detection zone.

In another aspect, there is provided a method of inspecting an object, the method comprising: positioning the object in a detection zone; introducing a vapour into the detection zone; emitting, from a light source, a light beam in a direction that passes through the detection zone; capturing, by an image sensor, a measurement image of the detection zone; determining, by a processor configured to receive the measurement image, a boundary of a scattered signal region in the received measurement image; and calculating a geometrical property of the object from the boundary of the scattered signal region. Features of the apparatus aspect discussed above may be equally applicable to the method aspect. In particular, the method may include capturing, by the image sensor, a background image of the detection zone in the absence of the vapour; obtaining, by the processor, a background signal from the background image; and removing, by the processor, the background signal from the received measurement image before determining the boundary of a scattered signal region.

The invention includes the combination of the aspects and preferred features described except where such a combination is clearly impermissible or expressly avoided.

BRIEF DESCRIPTION OF THE DRAWINGS

An embodiment of the invention is described below with reference to the accompanying drawings

DETAILED DESCRIPTION

Figure 3:
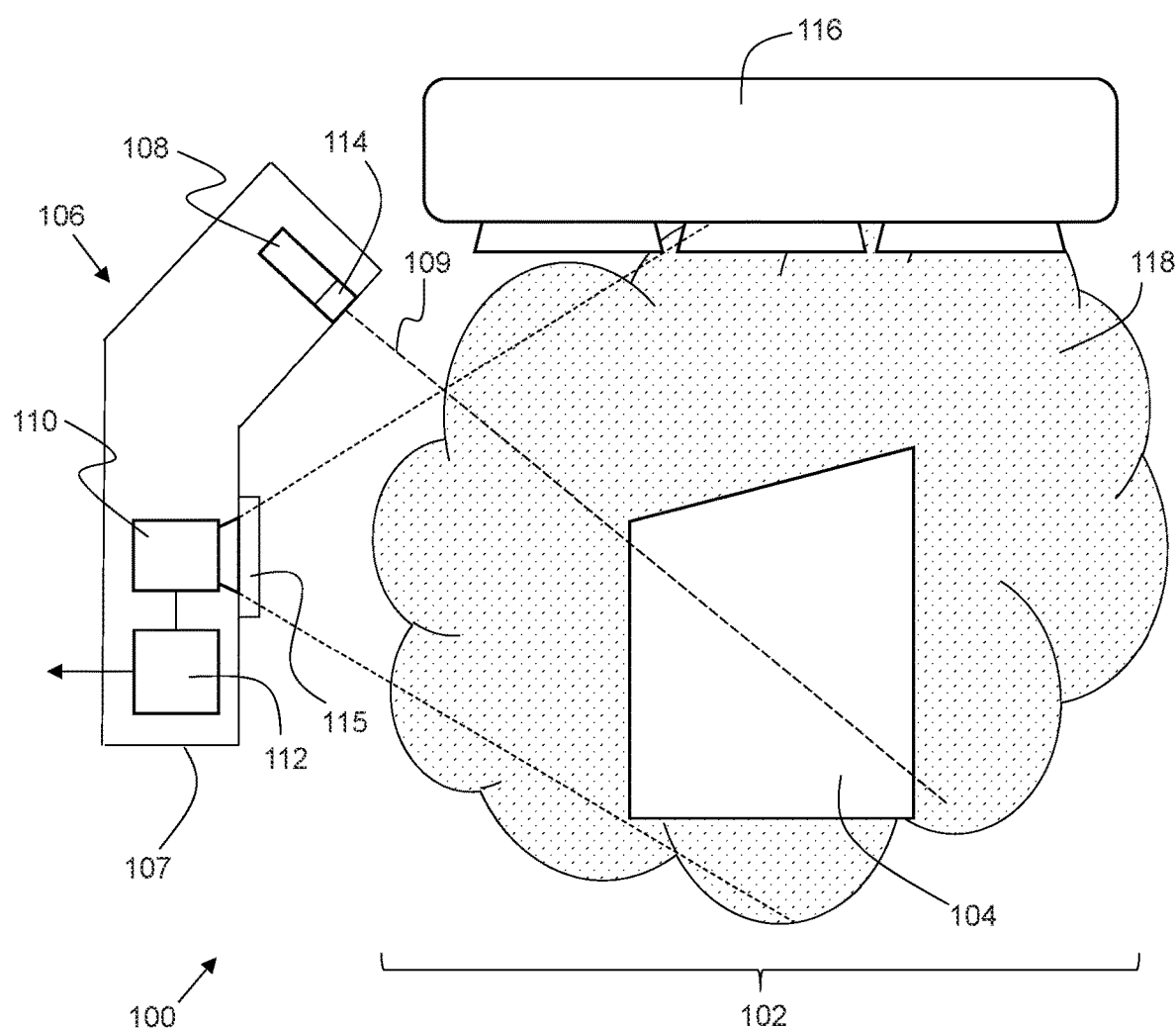
FIG. 3 is a schematic side view of an optical triangulation apparatus that is an embodiment of the invention.

FIG. 3 is a schematic side view of an optical triangulation apparatus 100 that is an embodiment of the invention. The apparatus 100 is configured to determine features of an object 104 that is present in a detection zone 102 by measuring how a flowable scattering medium, e.g. a gas, mist or vapour 118, present in the detection zone 102 interacts with light emitting by a light source 108. Herein, we use the terms "mist" and "vapour" interchangeably to define an airborne substance (solid, liquid or gas) that can occupy the detection volume 102 and interact with (by scattering) light from the light source 108. Unless required by the context, it is to be understood that the term "vapour" need not be limited to an evaporation process. It is to be interpreted as encompassing any process for forming a suspension of a gas or of fine liquid or solid particles in the air.

In the examples set forth herein, the vapour 118 or mist comprises fine liquid droplets, e.g. of distilled water or the like. Distilled water may be preferred because it leaves no residue and is safe. It may also be possible to use a gas (e.g. $CO_2$ obtained from dry ice) as the scattering medium.

In this example, the apparatus 100 comprises an optical triangulation sensor 106. The optical triangulation sensor 106 is configured in a similar manner to the laser triangulation measurement device 1 discussed above with respect to FIG. 1.

The optical triangulation sensor 106 comprises a light source 108 configured to generate and emit a planar light beam along a direction 109 that passes through the detection zone 102. The optical triangulation sensor 106 further comprises an image sensor 110 configured to capture an image of the detection zone 102. In particular, the image sensor 110 may be configured to capture light from the light source that is scattered by the vapour 118 in the detection zone. The light source 108 and image sensor 110 may be mounted in a housing 107. The housing 107 may form a unit suitable for manual or robotic manipulation relative to the detection zone 102.

The light source 108 may be any device capable of producing radiation for illuminating vapour 118 within the detection zone 102. For example, the light source 108 may comprise a laser source (e.g. laser diode or the like) and one or more optical components (e.g. a cylindrical lens or the like) for converting an output of the laser source into a planar beam. However, the invention may be used with light sources other than a laser, e.g. an LED or the like.

The light source 108 may be configured to generate light having a wavelength that is scattered by the vapour 118. The light source 108 may output optical radiation in the visible range of spectrum. In some examples the light source may output infrared and/or ultraviolet radiation. The light source 108 may be monochromatic (e.g. a laser as discussed above), or it may be broadband, e.g. a white light source. To achieve maximum sensitivity, the light source 108 may be configured to output a single wavelength that is at or near a peak scattering wavelength for the vapour 118. Where the vapour 118 is a mist of distilled water, the light source 108 may be a laser having a wavelength of 724 nm.

Figure 1:
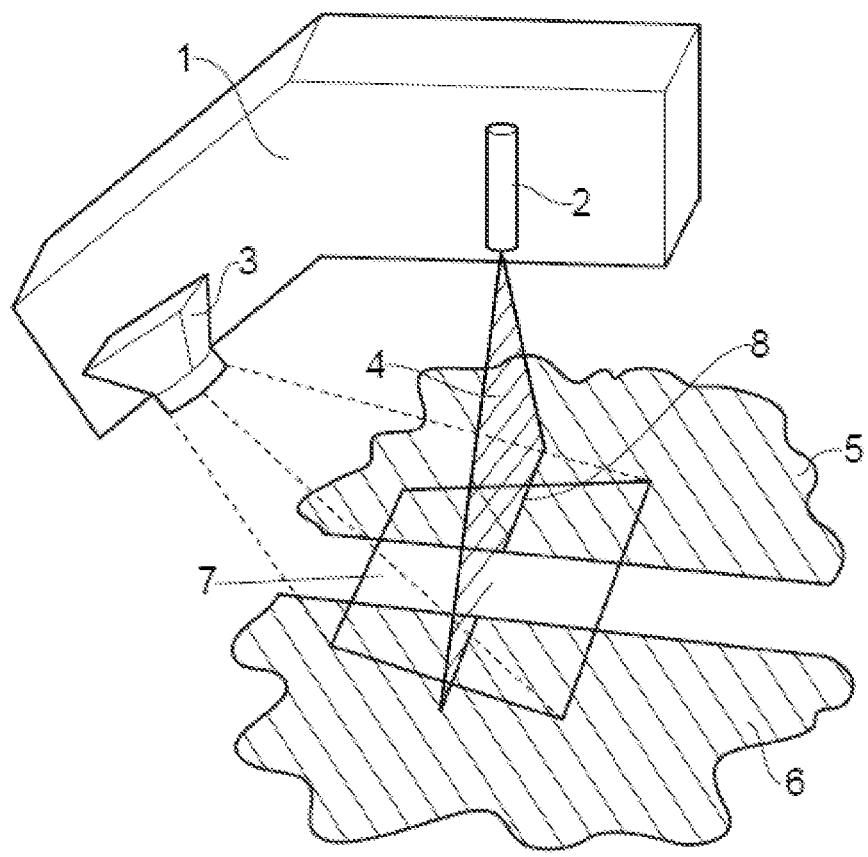
FIG. 1 is a schematic diagram of a conventional laser triangulation sensor and is discussed above.
Figure 2:
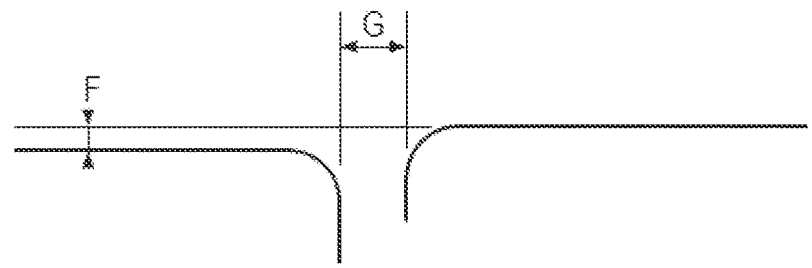
FIG. 2 is a cross-sectional view of a junction between two components illustrated a gap and flush condition and is also discussed above.

In the example shown in FIG. 1, the light source 108 generates a planar light beam, which thus acts to illuminate a planar region of the vapour 118 in the detection zone 102. The light beam may be thought of as a line of light that passes through the detection zone 102. This may be desired in order to minimise noise due to multiple reflections in the scattered signal captured by the image sensor 110. However, the use of a planar light beam need not be essential. In other examples, the light source 108 may produce a light beam with a two-dimensional cross-section relative to the direction of propagation through the detection zone. In such an example, it is desirable that the beam cross-section has at least one well-defined edge. Having a well-defined beam of this kind may assist in identifying a location in which the beam cease a scattering interaction with the vapour 118 in the detection zone.

The image sensor 110 may comprise a camera, e.g. having a charge coupled device (CCD) or an active pixel sensor (CMOS) device.

An object 104 in the detection zone 102 blocks the vapour 118 and hence may be considered as a void within a volume of vapour. The scattering of light from the vapour 118 terminates as the light beam reaches the object 104, by virtue of the fact that there is no vapour present in the volume occupied by the object. Information about the surface profile may thus be inferred from the shape of the boundary at which scattering from the vapour ceases. The manner in which this boundary is identified is discussed in more detail below.

It may be understood that the same effect of blocking the vapour is achieved for any type of object, irrespective of its optical properties (e.g. transparency or reflectivity). The technique disclosed here is thus suitable for obtaining accurate information about surface features of any type of object, without requiring special adaptation of the light source or image sensor, and without requiring any special interaction with or coating to be applied to the object.

Furthermore, a signal obtained by scattered from a vapour will exhibit little or no speckle, which can give better accuracy than measurements based on reflections from specular surfaces.

The technique may enable rapid measurement that known techniques that require material (e.g. condensation) to rest on the object because no interaction between the vapour and the object is needed.

The apparatus 100 may comprise a vapour generator 116 configured to generate the vapour 118. The vapour generator 116 may be configured to generate a cloud of vapour that diffuses through the detection zone. Any suitable means for producing the vapour may be used. For example, the vapour generator 116 may comprise an ultrasonic atomizer for generating the vapour. Alternatively, the vapour may be generator by heating a liquid source, e.g. using a steamer or the like. In this example, the apparatus 100 may further comprise a condenser (not shown) or other extraction device to facilitate removal of the vapour from the detection zone.

In another example, the vapour generator 116 may be configured to generate a spray that is directed through the detection zone, e.g. in a direction that lies across the field of view of the image sensor 110. Preferably the vapour is directed to occupy a volume around the plane of the laser beam. It may be desirable to minimise the amount of vapour this is present between the plane of the laser beam and the image sensor 110 in order to provide a clear transition between the scattered signal region and the scatter-free region.

The vapour generator 116 may utilise an ultra-low volume spray. The spray may be applied in a pulsed manner, such that the vapour 118 exists as a temporary stream through the detection zone while an image is captured. Such an arrangement may facilitate rapid collection of images with and without vapour present, e.g. to enable removal of any background signal. This is discussed in more detail below.

While in some cases the vapour 118 may occupy the detection zone 102 by diffusion or under the effects of gravity, in other examples the vapour generator 116 may be configured to actively promote flow of the vapour through the detection zone 102, e.g. using a fan or other means for creating an air flow to convey the vapour in a desired direction. The apparatus 100 may have an extractor fan (not shown) configured to remove vapour 118 from the detection zone 102, e.g. after an image is captured. The vapour generator 116 may have a guide outlet, e.g. a nozzle or funnel, configured to direct the vapour 118 towards the detection zone 102.

It may be desirable to minimise the amount of vapour 118 introduced to the detection zone 102, e.g. to avoid interference with the object 104. The vapour generator 116 may thus be configured to limit the amount of vapour that is produced. For example, the flow rate output by the vapour generator 116 may be equal to or less than 100 g/min, preferably equal to or less than 10 g/min.

The optical triangulation sensor 106 may comprise means (not shown) configured to prevent the vapour 118 from blocking the image sensor's view of the detection zone 102. For example, the apparatus 100 may include an air flow system or positive pressure system that keeps the vapour 118 away from an imaging aperture of the image sensor. Alternatively, the optical triangulation sensor 106 may include a heater configured to heat an external surface of the housing 107 to prevent condensation from forming over the imaging aperture.

Images obtained by the image sensor 110 are supplied to an image processor 112 that is configured to determine information about the geometry of a surface of the object 104 from the shape of vapour 118. As explained above, the object 104 operates to block the vapour 118. If the object were not present, the scattered light imaged by the image sensor 110 would resemble a substantially uniform "curtain" of vapour 118. When the object 104 is present, the "curtain" is interrupted, and the boundary of the interruption can be used to derive information about the shape of the surface of the object.

The boundary may be identified as sudden drop in intensity of the detected scattered signal. The image processor 112 may determine the location of the intensity drop using any suitable technique, e.g. by thresholding or the like. The intensity drop may have a profile across the image. Using conventional triangulation principles, this profile may be converted to a surface profile of the object 104.

To facilitate accurate determination of the surface profile, it is desired for the boundary to be identified as precisely as possible. To do this, it is desirable to improve the signal to noise ratio as much as possible. This can be done in a number of ways.

One factor that contributes to noise in the signal captured by the image sensor 110 is light that is scattered by multiple reflections before arriving at the image sensor. This can appear as a glow in the received signal. In an ideal scenario, the image of the "curtain" mentioned above is obtained by direct scattering, i.e. photons that are deflected once by the vapour into the image sensor. In the example shown in FIG. 3, the signal from multiply reflected photons is reduced or eliminated by polarising the light. If a laser is used as the light source 108, the output planar beam may already be in a polarised state. If the light is not naturally polarised, the light source may include a polariser 114 to apply a polarisation state to the light beam. Multiply scattered light will have a different polarisation from a directly (singly) scattered signal. The optical triangulation sensor 106 may further comprise a polarisation filter 115 at the image sensor 110, wherein the polarisation filter 115 is configured to filter out multiply scattered light by permitting passage of polarised light that corresponds to the directly scattered signal.

Any suitable polarising optical components may be used for the polariser 114 and polarisation filter 115. Using polarised light may also assist in removing optical light reflected from the object itself. For example, a direct reflection of polarised light from the object will have a known polarisation state, which may be filtered out at the image sensor.

Another factor that may contribute to noise in the received signal is background radiation in the detection zone 102 or, in some cases, a signal caused by the light interacting with the object itself. Conventionally, optical triangulation sensors are actually configured obtain and maximise a signal from the object itself. However, in the present case, such a signal may in fact obscure the boundary of the desired signal from the vapour and therefore, counterintuitively, the apparatus 100 of the invention may be configured to remove or reduce a signal caused by an interaction between the light beam and the object itself.

The background radiation may be measured by illuminating the detection zone 102 in the absence of the object 104 and the vapour 118. Any signal from the object 104 may be removed by capturing an image while illuminating the object 104 in the detection zone 102 without the vapour 118. Any signal obtained from these preliminary measurements may be subtracted from a signal obtained with the vapour present in order to obtain an output signal with an improved signal to noise ratio.

Figure 4:
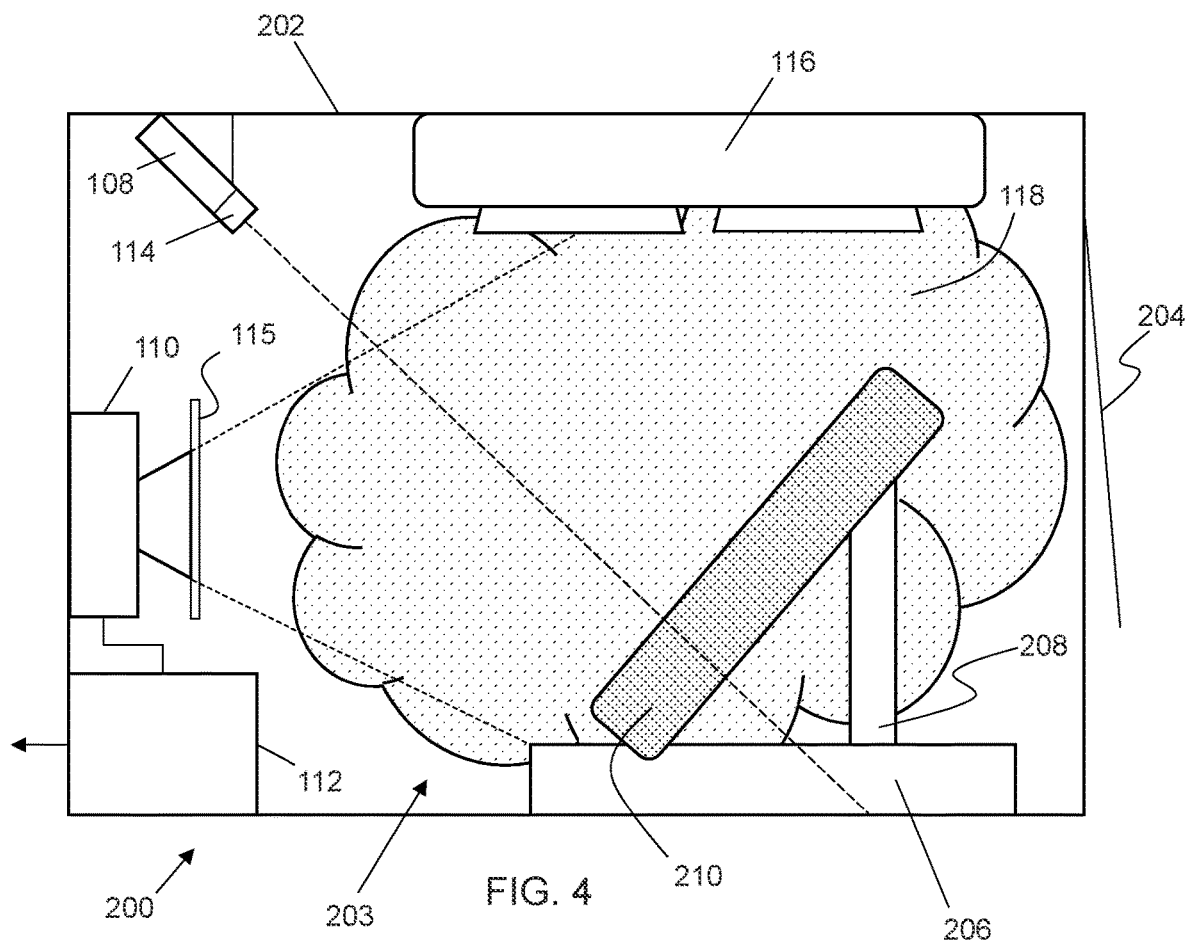
FIG. 4 is a schematic side view of an optical triangulation apparatus that is another embodiment of the invention.

FIG. 4 is a schematic side view of an optical triangulation apparatus 200 that is another embodiment of the invention. Features in common with the apparatus 100 shown in FIG. 3 are given the same reference number.

The apparatus 200 shown in FIG. 4 differs from the apparatus 100 shown in FIG. 3 in that it is mounted within an enclosure 202, e.g. a box-like housing or the like. The enclosure 202 defines an internal volume 203 that fulfils the function of the detection zone discussed above. The apparatus 200 may be suitable for use in measuring smaller scale objects, such as a smartphone or the like. The enclosure 202 has an entry port through which an object 210 can be inserted. The entry port may be closable by a door 204 or cover. Within the enclosure there may be an object support structure configured to position the object 210 in a predetermined position with respect to the image sensor 110, so that it occupies a known orientation with respect to the light beam from the light source 108 within the field of view of the image sensor 110. In this example, the object support structure comprises a platform 206 and stand 208, but it is to be understood that any suitable supports can be used.

The components of the optical triangulation sensor in the apparatus 200 (i.e. light source 108, the image sensor 110 and the processor 112) need not be contained within their own housing. Instead they may be mounted directly on the enclosure 202, e.g. on an internal surface thereof or on an external surface having a window that permits the light to pass into and out of the enclosed volume.

Figure 5:
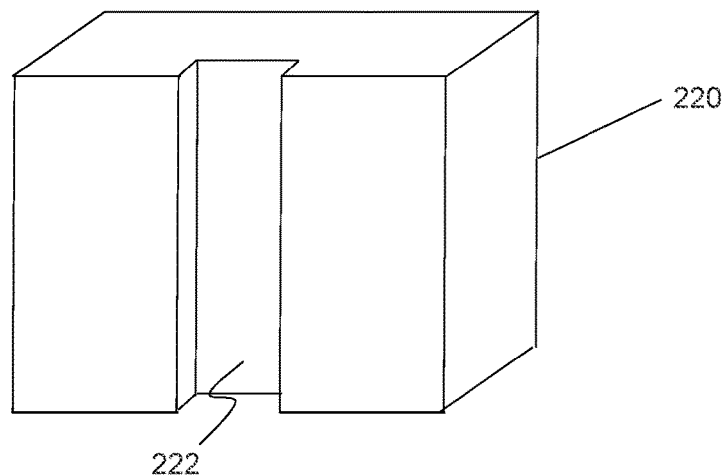
FIG. 5 is an example transparent object capable of being measured by the optical triangulation apparatus of FIG. 4.
Figure 6:
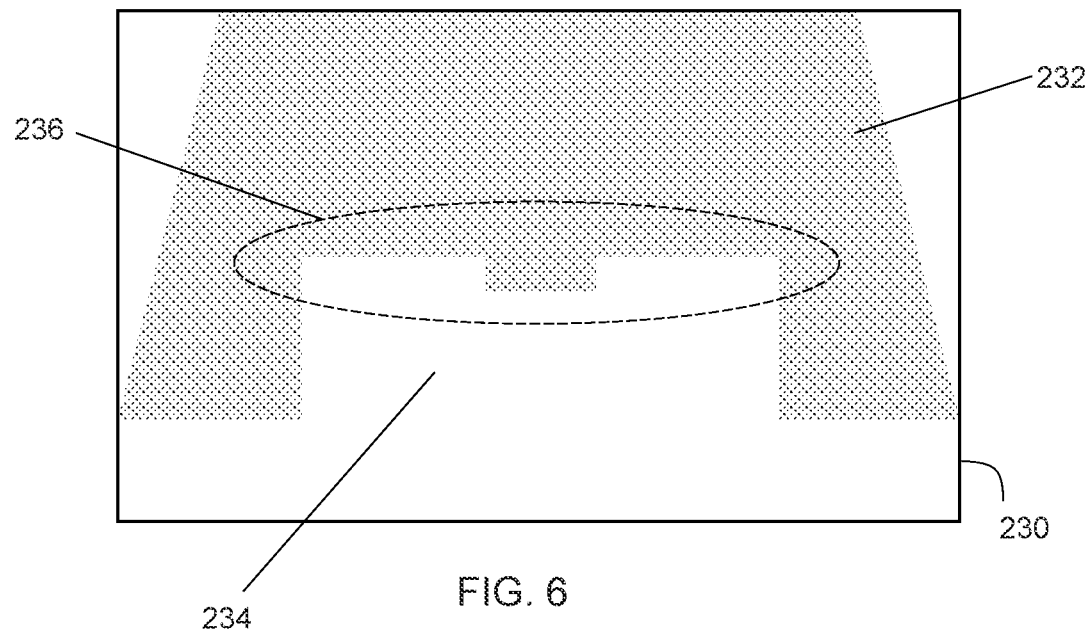
FIG. 6 is a schematic example image of the object shown in FIG. 5 obtained by an image sensor of the optical triangulation apparatus of FIG. 4.

An example of how the apparatus of the invention operates is now discussed with respect to FIGS. 5 and 6.

FIG. 5 is a schematic illustration of an example object 220. The object 220 has a front surface that has a vertical groove 222 formed therein. The groove 222 may be formed by machining or by joining separately subcomponents together. The apparatus of the invention may be used to determine a profile of the front surface, in particular to enable accurate non-contact measurement of the width of the groove 222.

The object 220 may be mounted in an apparatus 200 such as that shown in FIG. 4, whereupon the light beam from the light source is direct on to the front surface thereof when vapour 118 is present in the internal volume 203. FIG. 6 is a schematic representation of a measurement image 230 obtained from the apparatus 200. Light that is scattered into the image sensor from the vapour 118 causes the vapour to appear on the measurement image 230 as a scattered signal region 232, e.g. having a wavelength corresponding to the light produced by the light source 108. When the light path reaches the objection 220, it is no longer scattered by the vapour 118 and hence there is a drop in intensity of the scattering signal. This may be detected in the measurement image 230 as a scatter-free region 234 of lower (or zero) return intensity. As discussed above, in some circumstances the measurement image 230 may include a signal due to interaction between the light and the object, e.g. scattering or reflection off a surface of the object. The apparatus may obtain a preliminary measurement image of the object 220 in the enclosure 202 in the absence of vapour 118 in order to obtain this signal, which may then be subtracted or otherwise used to remove any signal from the object from the measurement image 230 obtained in the presence of vapour 118.

The measurement image 230 may be used to determine a boundary between the scattered signal region 232 and the scatter-free region 234, such as the boundary encircled by dotted line 236 in FIG. 6. Using conventional principles of triangulation, the profile of the boundary may be calculated and used to determine information about surface features of the object. In this example, it can be seen that the boundary has a feature corresponding to the groove in the object. The width of the feature may thus been determined from the measurement image 230.

In some circumstances, the object may be positions within the detection zone so that it is surrounded by vapour, i.e. so that the scattered signal region 232 completely surrounds the scatter-free region 234. In such examples, the apparatus may be used to calculate properties of the overall shape of the object, e.g. its thickness or cross-sectional shape. This may be useful for measuring the shape of a lens or the thickness of a piece of glass, for example.

The apparatus discussed above has one image sensor, but it is to be understood that in other examples there may be multiple image sensors arranged to provide different views of the detection zone. This may assist in determining properties of the object.

Figure 7:
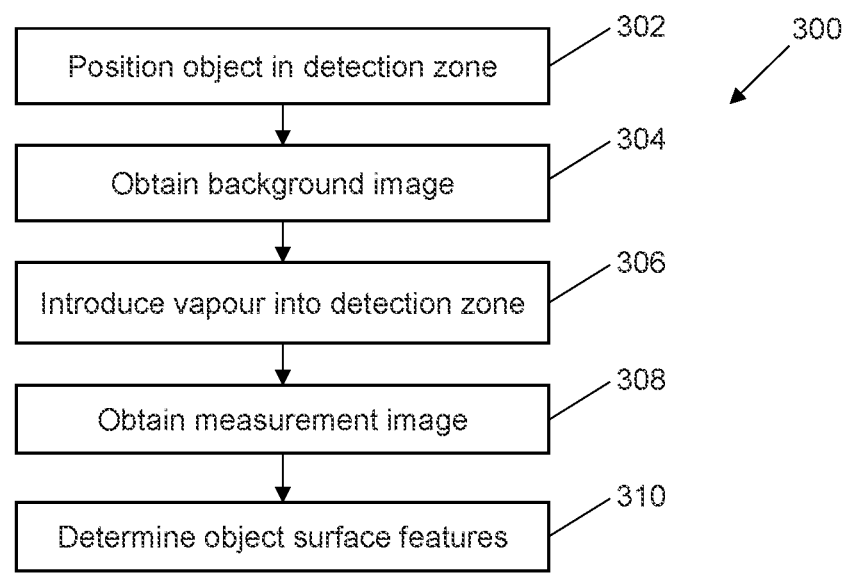
FIG. 7 is a flow chart showing a method of measuring an object that is an embodiment of the invention.

FIG. 7 is a flow chart showing a method 300 of measuring an object that is an embodiment of the invention.

The method 300 begins with a step 302 of positioning an object to be measured in a detection zone. This may include putting an object into an enclosure of the type discussed above with respect to FIG. 4. Alternatively it may involve manipulating an optical triangulation sensor and/or vapour generator, e.g. using a robotic arm or the like, to adopt a position relative to the object to allow a measurement to be made.

The method 300 continues with a step 304 of obtaining a background image. As discussed above, the background image may be obtained in the absence of vapour in order to detect a signal due to interaction between the light beam and the object, so that this signal can be reduced, e.g. removed or otherwise compensated for, in the image obtained when vapour is present. The background image may record a signal caused by ambient light in the detection zone, and therefore also enable this to be removed from a subsequently obtained image.

The method continues with a step 306 of introducing vapour into the detection zone. This step may involve activating a vapour generator and allowing the generated vapour to diffuse through the detection zone. The vapour generator may include a fan or the like to direct the vapour into the detection zone, e.g. across the field of view of the image sensor. In other example, this step may involve activating a spray to direct a jet of fine liquid droplets through the detection zone. The step may involve synchronising activation of the spray with capturing an image of the detection zone. For example, an image may be captured a short time after the spray is activated such that the image captures the detection zone at a point of time when the spray droplets are suspended in air throughout the detection zone.

When the vapour is present in the detection zone, the method 300 continues with a step 308 of obtaining a measurement image, e.g. by triggering an image sensor to capture an image. As mentioned above, the measurement image may be obtained by compensating or otherwise processing a captured image of the detection zone when vapour is present using information from an image obtained in the absence of vapour. This step 308 may therefore include processing a captured image using information from the background image to remove a signal caused by interaction of the object with light from the light source. The apparatus may be configured to collect a series of images as the vapour is introduced into the detection zone, i.e. as the density of the scattering medium in the detection zone increases.

The method continues with a step 310 of determining surface features of the object from the obtained measurement image. This step 310 may include identifying a boundary between a scattered signal region and a scatter-free region in the measurement image. For example, the boundary may be identified by a step change in intensity that exceeds a predetermined threshold. The step 310 may further include using the boundary to calculate information about the geometry of the object's surface.

The apparatus and method discussed above may be used in checking or other metrology process within a manufacturing environment. For example, the apparatus may be used to check gap and flush parameters between components in automotive manufacture. As discussed above, the apparatus of the invention may be particularly useful in measuring objects that are transparent or reflective, or which have high contrast regions. The apparatus may thus find use in measuring properties of transparent objects, such as headlight covers. The apparatus may be used to measure optical components, e.g. lenses, including contact lenses and spectacle lens.

The features disclosed in the foregoing description, or in the following claims, or in the accompanying drawings, expressed in their specific forms or in terms of a means for performing the disclosed function, or a method or process for obtaining the disclosed results, as appropriate, may, separately, or in any combination of such features, be utilised for realising the invention in diverse forms thereof.

While the invention has been described in conjunction with the exemplary embodiments described above, many equivalent modifications and variations will be apparent to those skilled in the art when given this disclosure. Accordingly, the exemplary embodiments of the invention set forth above are considered to be illustrative and not limiting. Various changes to the described embodiments may be made without departing from the spirit and scope of the invention.

For the avoidance of any doubt, any theoretical explanations provided herein are provided for the purposes of improving the understanding of a reader. The inventors do not wish to be bound by any of these theoretical explanations.

Any section headings used herein are for organizational purposes only and are not to be construed as limiting the subject matter described.

Throughout this specification, including the claims which follow, unless the context requires otherwise, the word "comprise" and "include", and variations such as "comprises", "comprising", and "including" will be understood to imply the inclusion of a stated integer or step or group of integers or steps but not the exclusion of any other integer or step or group of integers or steps.

It must be noted that, as used in the specification and the appended claims, the singular forms "a," "an," and "the" include plural referents unless the context clearly dictates otherwise. Ranges may be expressed herein as from "about" one particular value, and/or to "about" another particular value. When such a range is expressed, another embodiment includes from the one particular value and/or to the other particular value. Similarly, when values are expressed as approximations, by the use of the antecedent "about," it will be understood that the particular value forms another embodiment. The term "about" in relation to a numerical value is optional and means for example +/−10%.

The invention claimed is:

1. An optical triangulation apparatus comprising:
   a light source configured to emit a light beam through a detection zone;
   an image sensor configured to capture an image of the detection zone;
   a generator configured to introduce a flowable scattering medium into the detection zone; and
   a processor configured to:
      receive a background image of the detection zone that is captured by the image sensor in the absence of the flowable scattering medium;
      receive a measurement image of the detection zone captured by the image sensor;
      remove, from the received measurement image, a background signal obtained from the background image; and
      determine a boundary of a scattered signal region in the received measurement image.

2. The optical triangulation apparatus of claim 1, wherein the processor is configured to determine the boundary by identifying a transition between the scattered signal region and a scatter-free region.

3. The optical triangulation apparatus of claim 1, wherein the scattered signal region is a region in the received image corresponding to light in the light beam that is scattered by the flowable scattering medium.

4. The optical triangulation apparatus of claim 1, wherein the flowable scattering medium is a gas, mist or vapour.

5. The optical triangulation apparatus of claim 1 further comprising an enclosure that houses the light source and image sensor, wherein the enclosure comprises an object support structure for receiving an object in the detection zone.

6. The optical triangulation apparatus of claim 1, wherein the processor is further configured to calculate a geometrical property of the object from the boundary of the scattered signal region.

7. The optical triangulation apparatus of claim 1, wherein the light source is configured to emit polarised light, and wherein the image sensor includes a polarisation filter configured to reject light that is multiply scattered by the flowable scattering medium.

8. The optical triangulation apparatus of claim 1, wherein the generator comprises an atomizer configured to generate a fine mist of particles.

9. The optical triangulation apparatus of claim 1, wherein the generator comprises a spray configured to generate a fine mist of liquid droplets.

10. The optical triangulation apparatus of claim 1, wherein the generator comprises a heater configured to generate the flowable scattering medium by evaporating a liquid.

11. The optical triangulation apparatus of claim 1, wherein the flowable scattering medium comprises distilled water vapour.

12. The optical triangulation apparatus of claim 1, wherein the light source is a laser.

13. The optical triangulation apparatus of claim 1, wherein the light source comprises an optical component configured to emit a planar light beam through the detection zone.

14. A method of inspecting an object, the method comprising:
   positioning the object in a detection zone;
   capturing, by an image sensor, a background image of the detection zone in the absence of a flowable scattering medium;
   obtaining, by a processor, a background signal from the background image;

introducing the flowable scattering medium into the detection zone;

emitting, from a light source, a light beam in a direction that passes through the detection zone;

capturing, by the image sensor, a measurement image of the detection zone;

removing, by the processor, the background signal from the measurement image;

determining, by the processor, a boundary of a scattered signal region in the received measurement image; and calculating a geometrical property of the object from the boundary of the scattered signal region.

15. The method of claim 14 further comprising:

polarising the light beam emitted by the light source; and filtering, using a polarisation filter, light entering the image sensor to reject light that is multiply scattered by the flowable scattering medium.

16. The method of claim 14, wherein the flowable scattering medium is a gas, mist or vapour.

* * * * *